United States Patent [19]

Ogawa et al.

[11] Patent Number: 5,016,341
[45] Date of Patent: May 21, 1991

[54] A PROCESS FOR PRODUCING MAGNETIC HEADS OF THE FLOATING TYPE

[75] Inventors: Takahiro Ogawa, Osaka; Atsushi Inoue, Yao; Kiyotaka Ito, Daito; Yutaka Ueta, Yao; Kazuhiko Koga, Daito, all of Japan

[73] Assignee: Sanyo Electric Co., Ltd., Moriguchi, Japan

[21] Appl. No.: 347,372

[22] Filed: May 4, 1989

[30] Foreign Application Priority Data

May 6, 1988 [JP] Japan .................. 63-111324
Oct. 27, 1988 [JP] Japan .................. 63-271274

[51] Int. Cl.$^5$ .................. G11B 5/42
[52] U.S. Cl. .................. 29/603; 360/121; 360/127
[58] Field of Search .................. 29/603; 360/119-121, 360/126, 127

[56] References Cited

U.S. PATENT DOCUMENTS 4,425,701 1/1984 Takahashi et al. ............ 29/603
4,658,314 4/1987 Sasazaki .
4,815,197 3/1989 Ota et al. ............ 29/603
4,890,378 1/1990 Suzuki et al. ............ 29/603

FOREIGN PATENT DOCUMENTS 0175050 11/1988 European Pat. Off. .

OTHER PUBLICATIONS

Patent Abstracts of Japan, vol. 12, No. 439 (P-788) (3286) Nov. 18, 1988.
Patent Abstracts of Japan, vol. 7, No. 70 (P-185) (1215). Mar. 23, 1983.
I.E.E.E. Transactions of Magnetics, vol. MAG-23 (1987) Sep., No. 5, New York, pp. 2931-2933, by Nishiyama et al, "Recording Characteristics of Metal-in-gap Mini Composite Head".

Primary Examiner—Carl E. Hall
Attorney, Agent, or Firm—Armstrong, Nikaido, Marmelstein, Kubovcik & Murray

[57] ABSTRACT

A floating-type magnetic head comprising a slider and a core chip secured thereto. The core chip comprises a pair of core segments joined together with a gap spacer and a thin ferromagnetic metal film which are formed at the joint only over a portion of the entire area of the joint which portion terminates at the face of the core chip to be opposed to magnetic recording media. The two core segments area bonded to each other with glass present over the remaining portion of the joint area. In producing the magnetic head, the core chip is prepared by fabricating a core block comprising a pair of base plates joined together and strips of thin ferromagnetic metal film and gap spacer provided at the joint, and machining the core block.

12 Claims, 15 Drawing Sheets

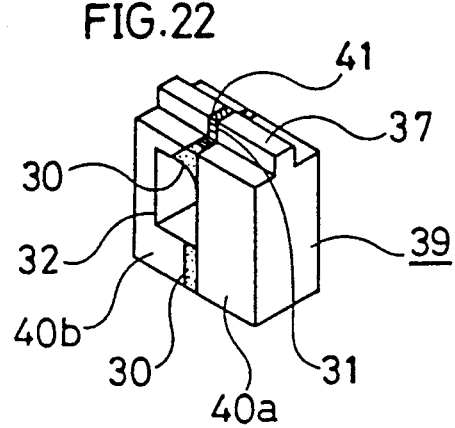
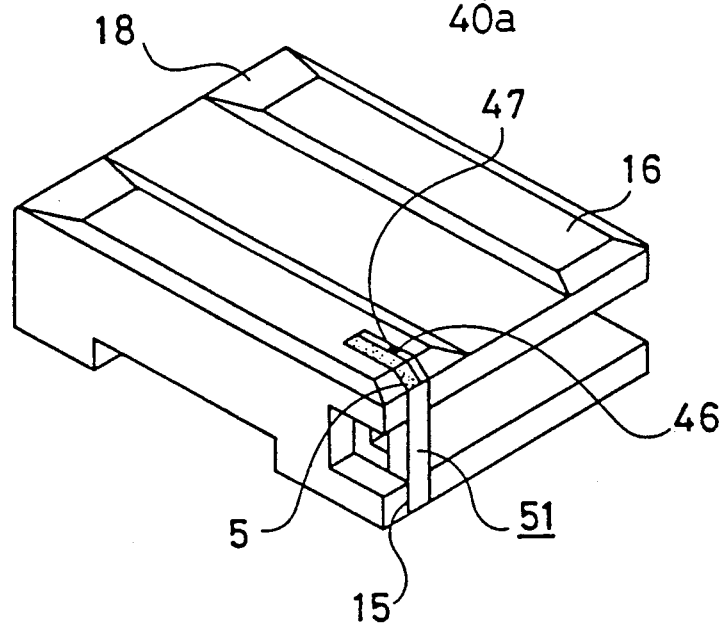
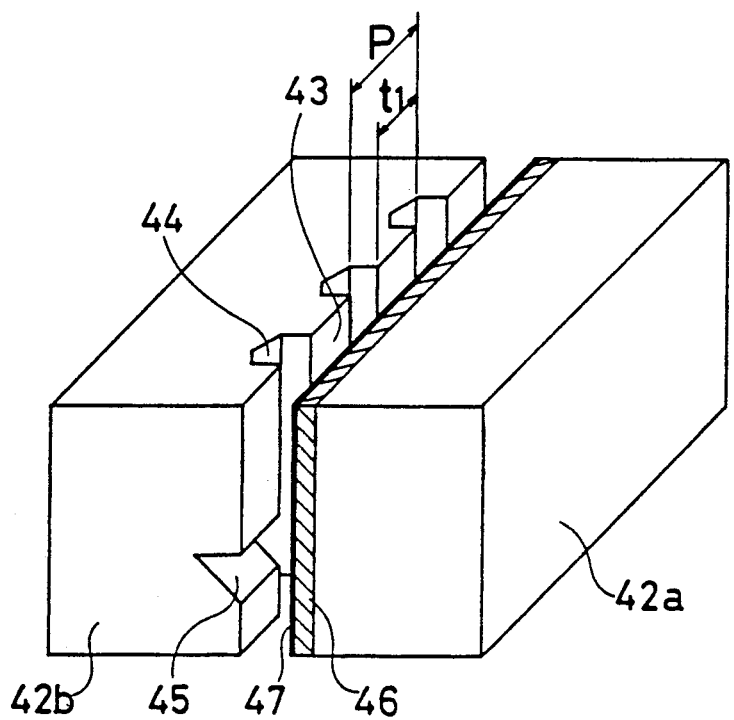

A PROCESS FOR PRODUCING MAGNETIC HEADS OF THE FLOATING TYPE

FIELD OF THE INVENTION

The present invention relates to magnetic heads for use in rigid disc drive devices or the like serving as external memory devices for electronic computers, and more particularly to floating-type magnetic heads having the face to be opposed to recording media and a core chip having a magnetic gap portion and attached to the slider, the invention further relating to a process for producing the magnetic head.

BACKGROUND OF THE INVENTION

In recent years, it has been greatly required that rigid disc drive devices, like other devices, be small-sized, and high-density recording on recording media has become an important problem. Accordingly, magnetic discs of the thin metal film type having a high coercive force (Hc) have been developed for use in place of those of the conventional oxide-coated type.

On the other hand, as magnetic heads for hard discs, floating-type magnetic heads are in use which comprise a slider having the face to be opposed to the recording medium and a core chip incorporated in the slider. It has been proposed to provide a core chip of the so-called MIG type (metal-in-gap type) especially in floating-type magnetic heads for use with rigid discs of the thin metal type. The core chip of the MIG type includes a film of Sendust, amorphous magnetic alloy or like highly saturated magnetic flux material formed by sputtering and opposed to the magnetic gap portion of the chip (see, for example, Unexamined Japanese Patent Publication SHO 62-295207).

FIG. 11 is a plan view of a MIG-type core chip fabricated according to the present invention for use with rigid discs, to show the magnetic gap portion in its face to be opposed to the recording medium. As far as the structure appearing on the medium opposed face is concerned, the core chip has the same construction as known MIG-type core chips.

More specifically, the core chip 4 comprises a pair of core segments 1a, 1b made of Mn-Zn ferrite and butting against each other, and a thin film 2 of ferromagentic metal such as Sendust and a gap spacer 3 of $SiO_2$ or the like. The core chip 4 is secured to a slider (not shown) with bonding glass portions 5, 5 to provide the floating-type magnetic head.

Such floating type magnetic heads have heretofore been produced by the process illustrated in FIGS. 32 to 41.

First, two base plates of Mn-Zn ferrite are prepared, both surfaces of each of the base plates are polished to a mirror finish, and the first of the base plates, 6a, is coated on its upper surface (gap forming surface) with a thin ferromagnetic metal film 2 and then with a gap spacer 3 of a thickness corresponding to the desired gap length by sputtering as shown in FIG. 32. A plurality of precut grooves 7 are formed at a given pitch P in the upper surface (gap forming surface) of the second base plate 6b to obtain ridges with a preliminary track width $t_1$ slightly larger than the desired track width as shown in FIG. 33.

Next as shown in FIG. 34, a plurality of winding grooves 8 are formed in the gap forming surface of the second base plate 6b, and the two base plates 6a, 6b are fitted together with their gap forming surfaces opposed to each other. Further as seen in FIG. 35, glass bars 9 are inserted into the respective winding grooves 8, then melted and solidified, filling the precut grooves 7 with glass 10 as shown in FIG. 36 and giving a block 11 composed of the pair of base plates 6a, 6b bonded together with the glass.

Next, the block 11 is cut into a plurality of core blocks 14 along broken lines A-A'. A plurality of truck width defining grooves 12 are cut at a predetermined pitch in the head portion of each core block 14 to form a plurality of medium facing ridges 13 having the desired track width $t_2$ as shown in FIG. 37.

The core block 14, when sliced, affords core chips 4 each comprising a pair of core segments 1a, 1b, a thin ferromagnetic metal film 2 and a gap spacer 3 as seen in FIG. 38.

Next, sliders 16 as shown in FIG. 39 are prepared which are made of a nonmagnetic ceramic such as calcium titanate, each core chip 4 is fitted in a slit 15 formed in the slider 16, and a glass plate 17 having a lower softening point than the glass bar 9 is placed on the core chip 4 as shown in FIG. 40.

The glass plate 17 is thereafter melted and solidified, thereby filling the glass 5 into the spaces at opposite sides of the medium facing ridge 13 and into the clearance in the slider slit 15 around the core chip 4 and bonding the core chip 4 to the slider 16. Finally, the slider 16 is chamfered as at 18 to finish the exterior, whereby a floating-type magnetic head is completed as shown in FIG. 41.

In preparing the conventional magnetic head by the above process, the upper surface of the base plate 6a of Mn-Zn ferrite is coated by sputtering with the thin ferromagnetic metal film 2 which is different from the Mn-Zn ferrite in coefficient of expansion in the step of FIG. 32, with the result that the base plate 6a warps during sputtering due to a change in temperature to create a great error in the gap length of the magnetic gap portion finally obtained.

In the steps of FIG. 34 through FIG. 36, moreover, the $SiO_2$ film and the ferrite base plate, which are not satisfactorily wettable with glass, are bonded together with glass to fabricate the block 11. Consequently, the block 11 is very low in bond strength and is likely to fracture or crack in the subsequent step. The core chip 4 eventually obtained is also low in the strength of bond between the core segments 1a and 1b.

Further in bonding the two base plates to each other with glass, the glass bar 9 needs to be heated to a temperature about 150° to 250° C. higher than the softening point (e.g., 590° C.) of the glass. This permits a reaction to proceed at the interface between the ferrite base plate and the thin Sendust film, possibly forming a quasi-gap or a secondary gap at the interface.

Additionally, the step of FIG. 32 wherein the upper surface of the first base plate 6a is coated with the thin ferromagnetic metal film 2 by sputtering gives rise to the problem that sputtered metal particles disturb the crystallinity of the first base plate surface owing to the resulting impact or the like, consequently forming a nonmagnetic amorphous layer at the interface between the first base plate 6a and the metal film 2 for the amorphous layer to provide a secondary gap.

SUMMARY OF THE INVENTION

An object of the present invention is to provide a magnetic head of the floating type which can be fabricated with an accurate gap length despite the temperature change involved in the thin film forming step and in which the core segments of the core chip are firmly bonded to each other, and a process for producing the magnetic head.

Another object of the invention is to provide a process for producing floating-type magnetic heads without creating any secondary gap at the interface between the core segment of the core chip and the thin ferromagnetic metal film thereof.

The floating-type magnetic head of the present invention comprises a core chip composed of a pair of core segments, and a gap spacer and a thin ferromagnetic metal film provided at the joint between the pair of core segments, the gap spacer and the metal film being formed only over a portion of the entire area of the joint between the pair of core segments which portion has a larger width than the specified width, only glass for bonding the core segments to each other being present over the remaining portion of the joint area.

In producing the magnetic head of the invention, the core chip is fabricated by a process comprising the first step of preparing first and second base plates made of a ferromagnetic oxide and forming on the surface of the first base plate to be bonded to the second base plate a plurality of strips each composed of a thin ferromagnetic metal film and a gap spacer over the metal film and having a width larger than the desired truck width, the second step of bonding together the first base plate and the second base plate obtained by the first step with a first glass to prepare a core block, the third step of cutting truck width defining grooves in the core block to form a plurality of medium facing ridges each including the metal film and the gap spacer and having a width equal to the desired truck width, and the fourth step of cutting the resulting core block into core chips each including the metal film and the gap spacer. The core chip obtained by the fourth step is bonded to a slider with a second glass having a lower softening point than the first glass.

The two base plates are bonded together by forming a plurality of grooves in the second base plate between the strip-like surface areas thereof to be joined to the gap spacers and filling these grooves with the first glass in the first step, and melting and solidifying the first glass with the first and second base plates joined together in the second step.

With the magnetic head described above, the pair of core segments, each made of a ferromagnetic oxide which is highly wettable with glass, are directly bonded to each other with the glass at opposite sides of the area where the thin ferromagentic metal film and the gap spacer are present. This gives the joint of the core segments higher bond strength than heretofore possible.

With the process for producing the magnetic head, the thin ferromagnetic metal film is deposited over a smaller area than conventionally, consequently rendering the base plate free of warping and affording a magnetic gap portion with improved accuracy.

The two base plates are bonded to each other with the first glass as filled in the plurality of grooves in one of the base plates, so that the temperature to which the glass is heated for bonding can be lower than conventionally, e.g., a lower temperature which is about 80° C. higher than the softening point of the first glass. This serves to inhibit the reaction conventionally occurring at the interface between the first base plate and the metal film owing to the high temperature used to preclude the creation of a secondary gap.

When one of the base plates is to be coated with the thin ferromagnetic metal film and the gap spacer as by sputtering, the gap spacer may be formed over the base plate first. A nonmagnetic amorphous layer, if formed on the base plate, will then serve as part of the gap spacer without forming a secondary gap.

BRIEF DESCRIPTION OF THE DRAWINGS

FIGS. 13 to 22 are views for illustrating stepwise a process for producing the magnetic head of FIG. 12;

FIG. 23 is a perspective view of another floating-type magnetic head as a third embodiment;

FIGS. 24 to 29 are views for illustrating stepwise a process for producing the magnetic head of FIG. 23;

DETAILED DESCRIPTION OF EMBODIMENTS

The present invention will be described below in greater detail with reference to first to fourth embodiments thereof.

First Embodiment

Figure 1:
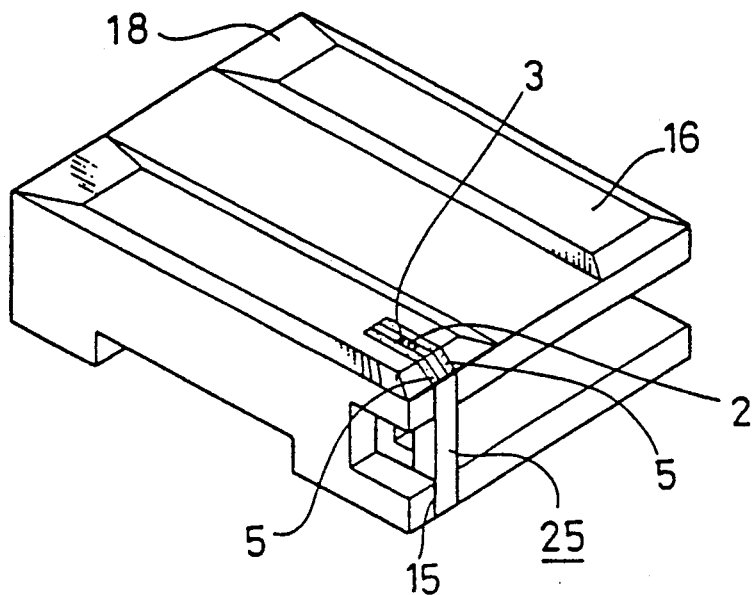
FIG. 1 is a perspective view of a floating-type magnetic head as a first embodiment.

FIG. 1 shows a magnetic head of the floating type which comprises a slider 16 having a slit 15, and a core chip 25 fitted in the slit and bonded to the slider 16 with glass portions 5, 5. The core chip 25 includes a thin ferromagnetic metal film 2 facing a gap spacer 3 providing a magnetic gap portion.

Figure 2:
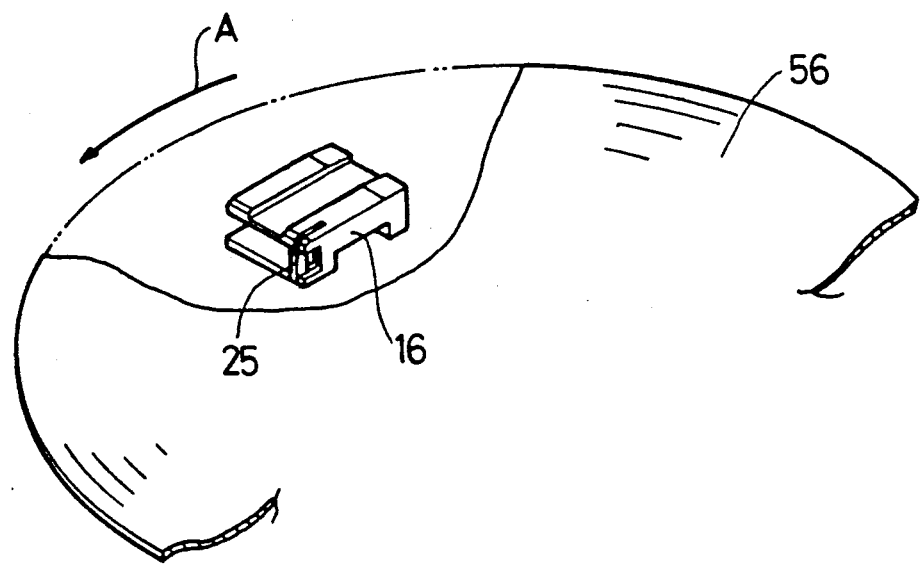
FIG. 2 is a perspective view partly broken away and showing the magnetic head of FIG. 1 as used for a magnetic disc.

With reference to FIG. 2, the magnetic head is disposed as opposed to a magnetic disc 56. The disc 56 is driven at a high speed in the direction of arrow A, whereby a layer of stabilized air current is formed between the disc and the head, thereby holding the head in a predetermined floating position off the disc surface.

Next, a process will be described for producing the magnetic head of FIG. 1 with reference to FIGS. 3 to 10.

Figure 3:
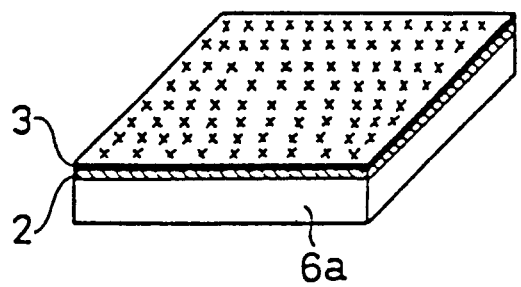
FIGS. 3 to 10 are views for illustrating stepwise a process for producing the magnetic head of FIG. 1.

First and second base plates 6a, 6b made of Mn-Zn ferrite are prepared, the upper surface (gap forming surface) and the lower surface of the first base plate 6a are polished to a mirror finish, and the upper surface of the first base plate 6a is coated with a thin film 2 of a ferromagnetic metal, such as Sendust, having a thickness of 3.5 $\mu$m. The upper surface of the thin film 2 is coated with a gap spacer 3 made, for example, of SiO$_2$ and having a thickness of 0.8 μm as seen in FIG. 3.

The thin ferromagnetic metal film 2 is formed using an opposite target sputtering device under the conditions of: base plate temperature 200° C., gas pressure 2 torr, discharge power 4 kW, bias voltage 50 V and film forming rate 1400 angstroms/min. The gap spacer 3 is formed by an ion plating device at a base plate temperature of 200° C., a vacuum of $1.0 \times 10^{-5}$ torr and a film forming rate of 600 angstroms/min.

Figure 4:
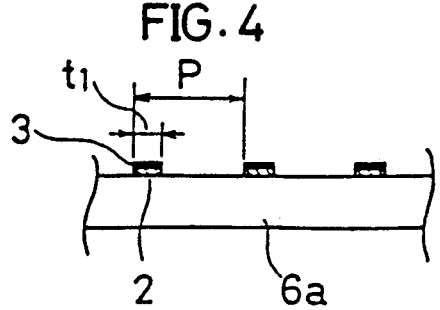

With reference to FIG. 4, the coated surface of the first base plate 6a is etched using a dry etching device such as an ion beam etching device to leave strips of metal film 2 and gap spacer 3 on the surface at a predetermined pitch and remove the other portions of the film 2 and the spacer 3. The strips have a preliminary track width $t_1$ (about 50 μm) larger than the desired track width $t_2$ (about 13 μm). The ion beam etching operation is conducted under the conditions of: gas pressure $2 \times 10^{-4}$ torr, discharge voltage 34.5 V, acceleration voltage 750 V and incidence angle 40°, for about 135 minutes until the undesired portions of the metal film 2 and the gap spacer 3 are completely removed.

Instead of resorting to ion beam etching, the metal film 2 and the gap spacer 3 can be formed directly on the base plate 6a in the pattern shown in FIG. 4, for example, by mask sputtering.

Figure 5:
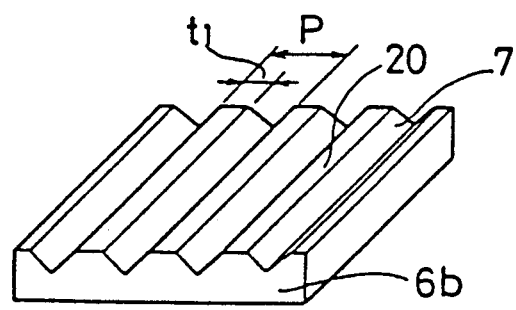
Figure 6:
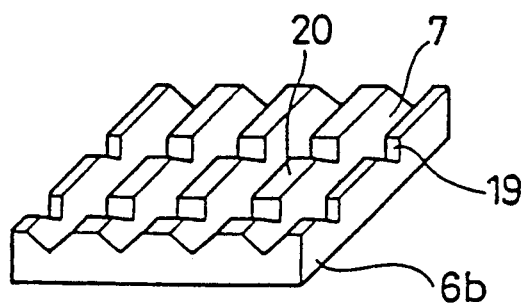

On the other hand, precut grooves 7 are formed at a predetermined pitch in the upper surface (gap forming surface) of the second base plate 6b to form preliminary track faces 20 having a width equal to the width $t_1$ as seen in FIG. 5. A plurality of depth end grooves 19 are then formed in the second base plate 6b to intersect the precut grooves 7 perpendicular thereto as seen in FIG. 6.

Figure 7:
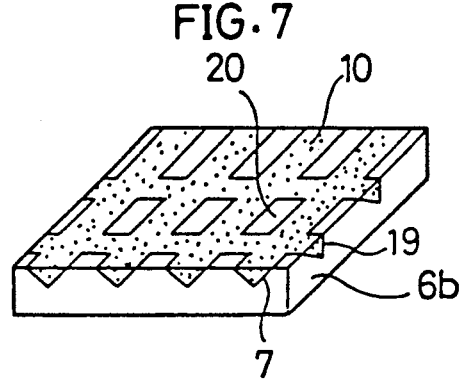

Subsequently, the second base plate 6b is heated with a plate of first glass with a softening point of 590° pressed against the plate 6b, whereby the precut grooves 7 and the depth end grooves 19 are filled with the first glass 10 as shown in FIG. 7. The glass filled surface is then polished to a mirror finish. The glass is filled in by maintaining the second base plate 6b in a vacuum at 590° C. for 70 minutes.

Figure 8:
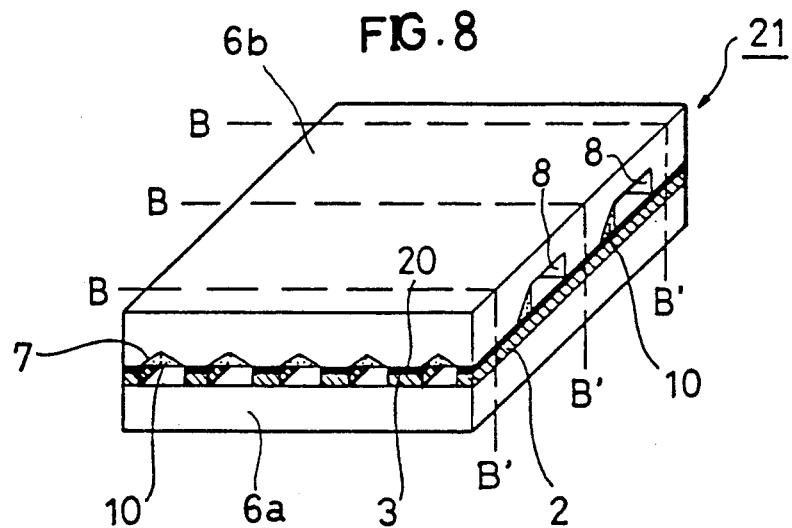

With reference to FIG. 8, a plurality of winding grooves 8, rectangular in cross section, are formed in the gap forming surface of the second base plate 6b in parallel to the depth end grooves 19 and as so positioned as to partially remove the plate portions defining the depth end grooves 19. The two base plates 6a, 6b are thereafter fitted together with their gap forming surfaces opposed to each other and with the gap spacers 3 opposed to the respective preliminary track faces 20, and the first glass 10 is melted and solidified in this state, whereby the plates 6a, 6b are bonded together with the glass to make a block 21. For glass bonding, the assembly is maintained at 670° C. in a vacuum for 12 minutes. Consequently, the molten glass fills up every corner around the strips of metal film 2 and gap spacer 3 between the two base plates.

The block 21 is then cut into core blocks 22 along broken lines B–B'. Track defining grooves 12 are then cut at a predetermined pitch P in the head portion of the core block 22 to form a plurality of medium facing ridges 23 having the specified track width $t_2$ as shown in FIG. 9.

Figure 9:
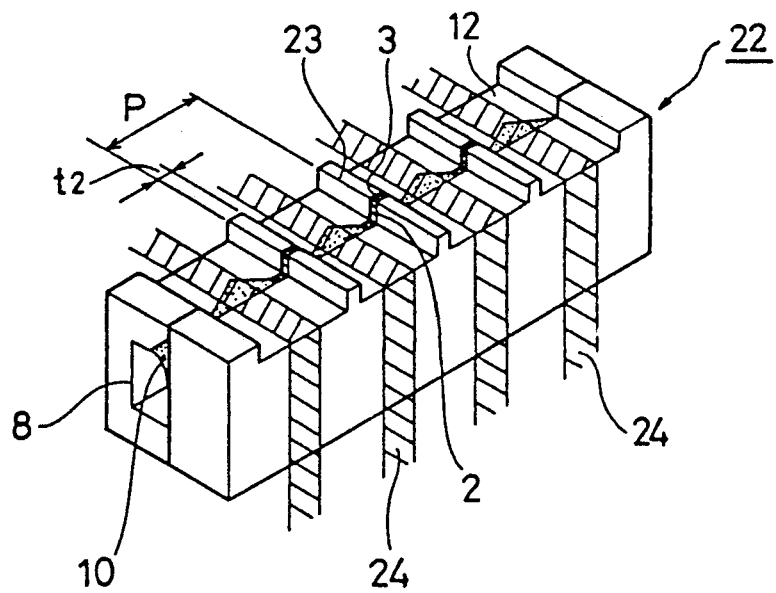
Figure 10:
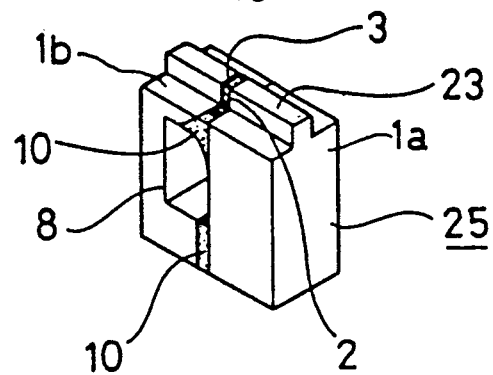

Next, the core block 22 is sliced at the hatched regions 24 shown in FIG. 9 to prepare core chips 25 as seen in FIG. 10. The core chip 25 comprises a pair of core segments 1a, 1b of Mn-Zn ferrite, with the metal film 2 and the gap spacer 3 provided at the joint therebetween, and are bonded to each other with the glass at the joint areas on opposite sides of the strip of film 2 and spacer 3.

Figure 40:
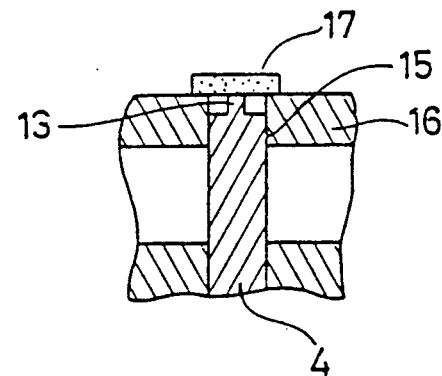
Figure 41:
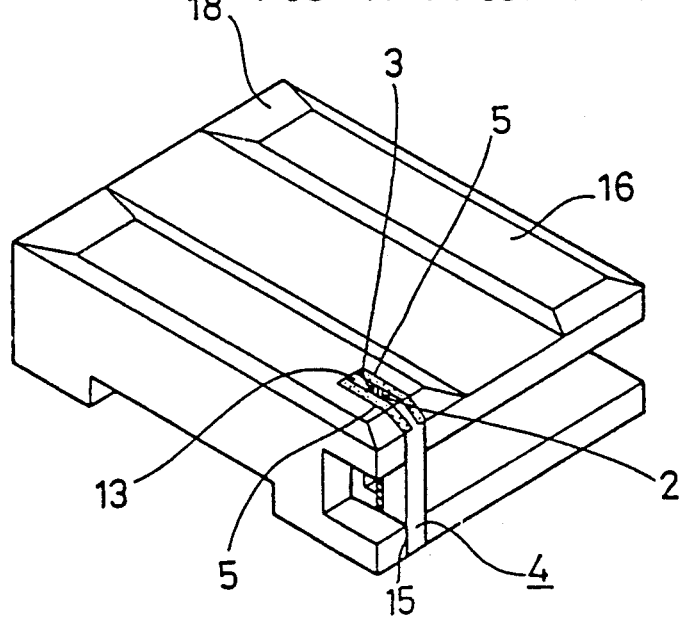
FIG. 41 is a perspective view of the conventional magnetic head.

The core chip 25 is inserted into the slit 15 of the nonmagnetic ceramic slider 16 shown in FIG. 1. A plate 17 of second glass having a softening point of 460° C. is placed on the core chip 25 as in the conventional process shown in FIG. 40 and melted and solidified, whereby the second glass 5 is filled into the spaces at opposite sides of the medium facing ridge 23 and into the clearance in the slit 15 around the core chip 25 as shown in FIG. 1 to bond the core chip 25 in the slit 15 to the slider. The glass is filled in by heating the assembly to 500° C. in atmosphere or a vacuum. Finally, the slider 16 is chamfered as at 18 to finish the exterior to provide a completed floating-type magnetic head.

In the thin film forming step of FIG. 3 included in the above process for producing the magnetic head, an internal stress, even if occurring, is almost completely released since a major portion of the thin film is removed by the etching step of FIG. 4. This precludes the warping of the base plate 6a shown in FIG. 4 that would otherwise occur owing to the stress. Consequently, the magnetic gap portion of the head eventually obtained has a very accurate gap length.

Figure 10A:
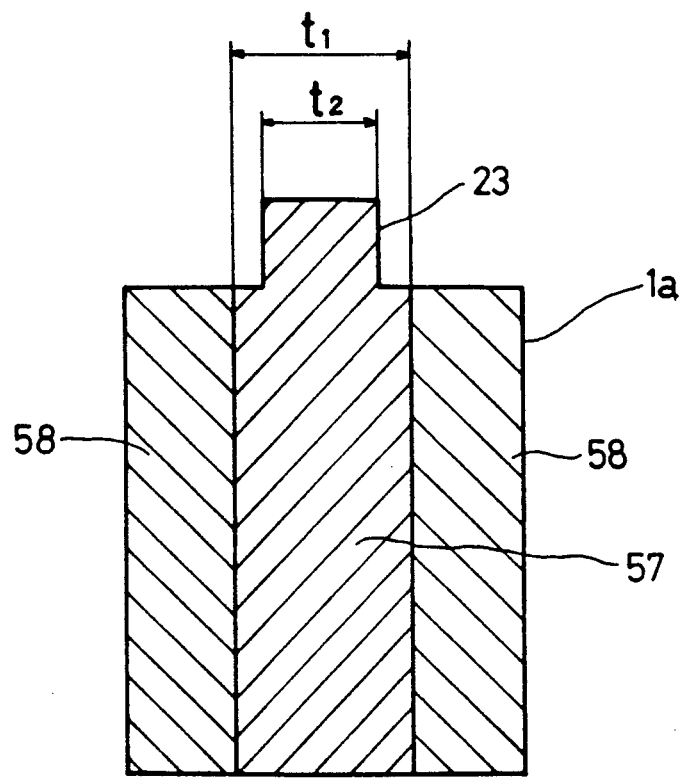
FIG. 10A is a view in section taken along the joint between the core segments of the core chip shown in FIG. 10.
Figure 11:
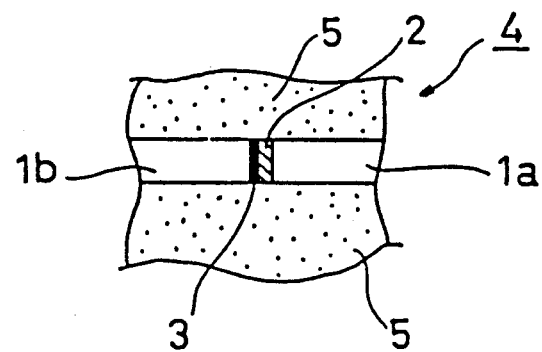
FIG. 11 is an enlarged plan view showing the magnetic gap portion of the magnetic head of FIG. 1.

Further with the core chip 25 shown in FIG. 10, the thin ferromagnetic metal film 2 and the gap spacer 3 are present at the joint between the two core segments 1a, 1b over the central area 57 thereof shown in FIG. 10A and including the medium facing ridge 23, while at the areas 58, 58 on opposite sides of the area 57, the core segments 1a, 1b, each made of the ferrite which is satisfactorily wettable with glass, are directly bonded to each other with the glass. The core chip 25 therefore has high mechanical strength.

Further with the foregoing production process, the first and second base plates 6a, 6b are bonded with the first glass 10 as filled in the precut grooves 7 and the depth end grooves 19 in the second plate 6b as seen in FIG. 8 by softening the glass. Thus, the first glass 10, when merely heated to a temperature about 80° higher than its softening point, is allowed to fully penetrate the clearance between the two base plates. The temperature employed for glass bonding is therefore about 70° to 170° C. lower than conventionally, with the result that almost no reaction proceeds at the interface between the first base plate 6a and the thin metal film 2 to obviate the secondary gap that was conventionally formed by reaction.

Further even if the crystalline characteristics of the base plate 6a is somewhat disturbed owing to the collision of sputtered metal particles in the step of forming the thin ferromagentic metal film, the temperature to which the base plate is heated for glass bonding subsequently is lower than is used conventionally, with the result that the layer formed by the reaction between the amorphous layer due to disturbed crystals and the deposited metal film will not further develop into a secondary gap which would adversely affect the performance of the head.

Second Embodiment

Figure 12:
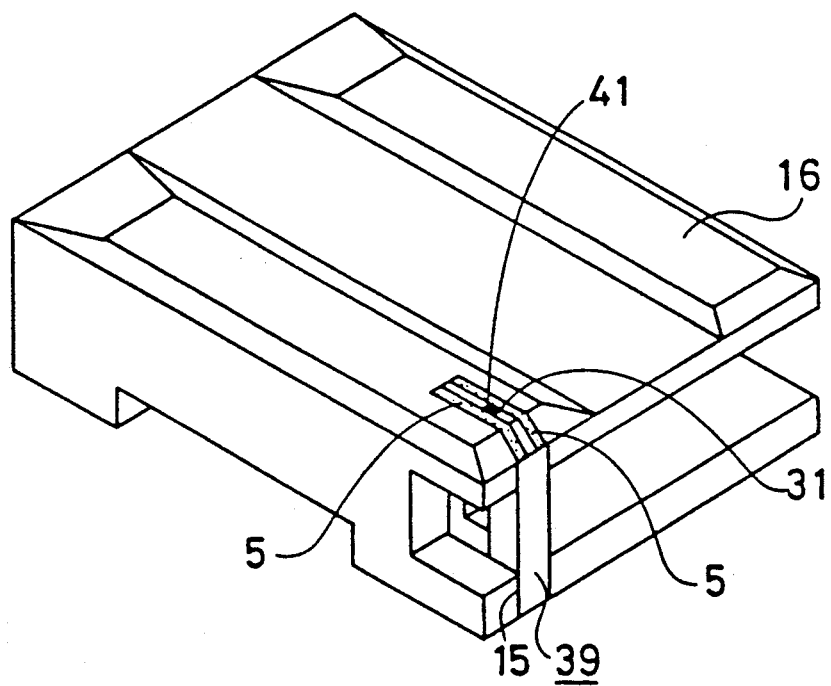
FIG. 12 is a perspective view of another floating-type magnetic head as a second embodiment.

FIG. 12 shows another floating-type magnetic head as a second embodiment, which is produced by the process to be described below with reference to FIGS. 13 to 22.

Figure 13:
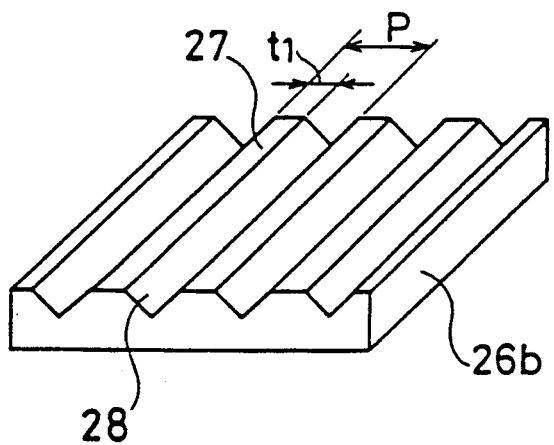

First, first and second base plates 26a, 26b made of a ferrimagnetic oxide material such as Mn-Zn ferrite are each polished to a mirror finish over the upper surface (gap forming surface) and the lower surface thereof. Precut grooves 28 are then cut at a predetermined pitch P in the upper surface of the second base plate 26b to leave preliminary truck faces 27 having a preliminary track width $t_1$ slightly larger than the desired track width $t_2$ as shown in FIG. 13.

Figure 14:
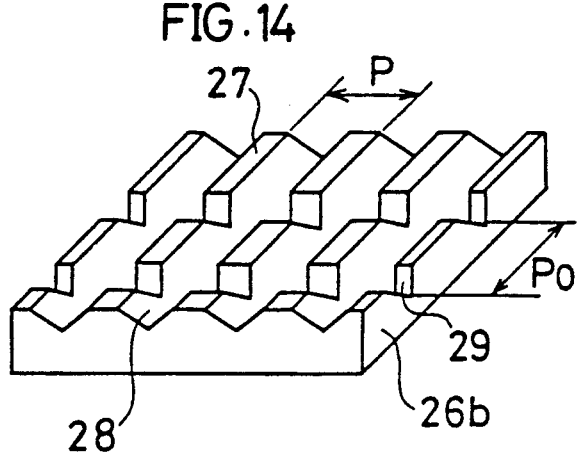

As shown in FIG. 14, a plurality of depth end grooves 29 intersecting the precut grooves 28 perpendicular thereto are formed at a predetermined pitch Po in the upper surface of the second base plate 26b.

Figure 15:
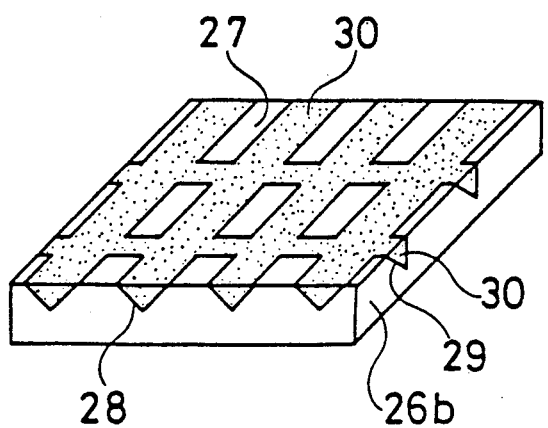

Next, a first glass 30 having a softening point of 590° is filled into the precut grooves 28 and the depth end grooves 29, and the glass filled surface is then polished to a mirror surface as seen in FIG. 15.

Figure 16:
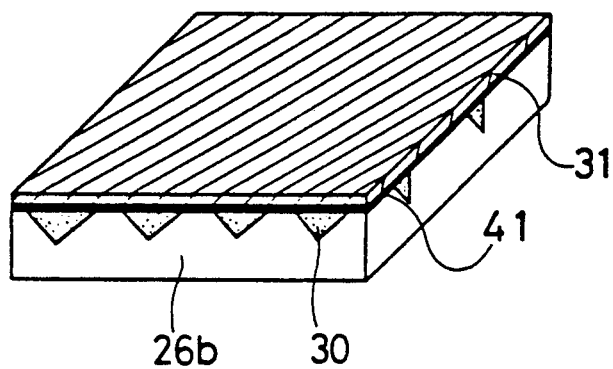

With reference to FIG. 16, the entire upper surface of the second base plate 26b is thereafter coated with a gap spacer 41 made of $SiO_2$ or the like and having a thickness of 0.8 μm, and the upper surface of the gap spacer 41 is coated with a thin film 31 made of a ferromagnetic metal such as Sendust and having a thickness of 3.5 μm by sputtering.

Figure 17:
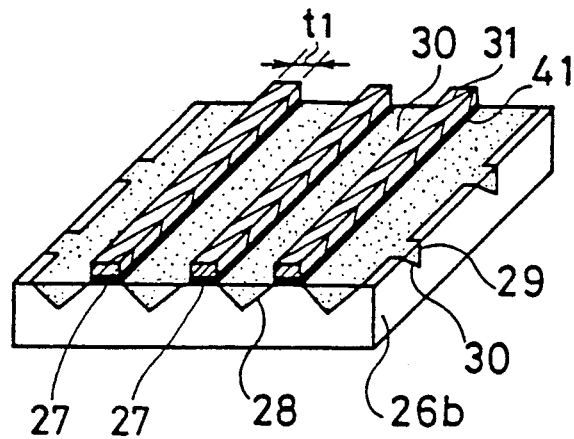

With reference to FIG. 17, the thin metal film and the gap spacer covering the first glass 30 are removed therefrom using a dry etching device such as ion beam etching device except for the spacer and film portions 41, 31 on the preliminary track faces 27. The width of the metal film 31 left unremoved by this step is equal to the width $t_1$ of the preliminary track faces 27.

Figure 18:
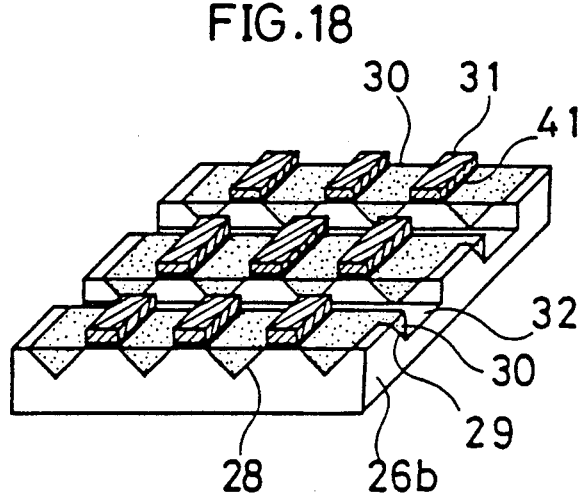

With reference to FIG. 18, a plurality of winding grooves 32, rectangular in cross section, are formed in the upper surface of the second base plate 26b in parallel to the depth end grooves 29 so as to partially remove the portions of the plate defining the depth end grooves 29.

Figure 19:
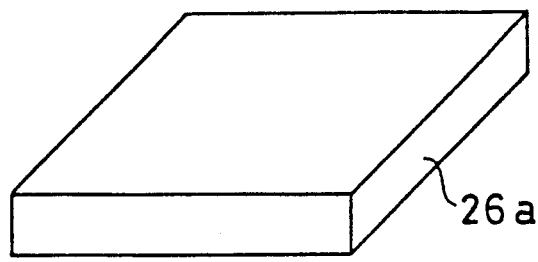
Figure 20:
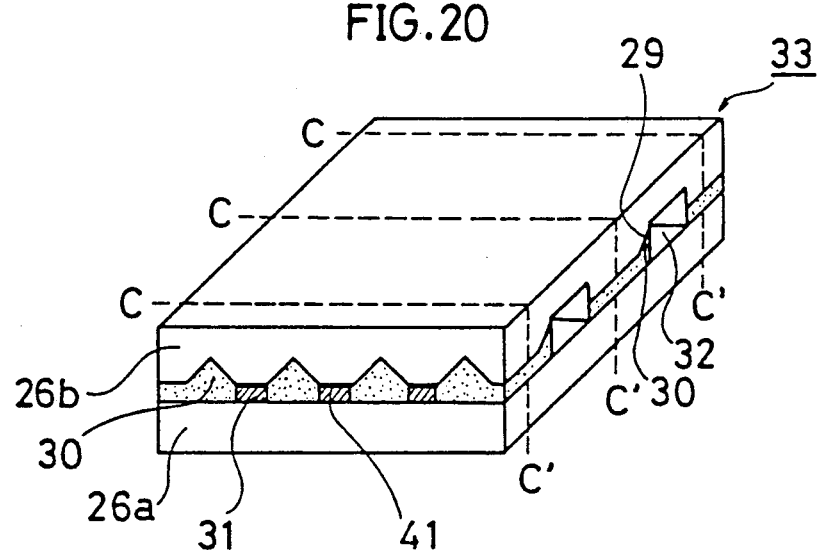

Next, the mirror-finished upper surface of the first base plate 26a shown in FIG. 19 is placed over the thin metal film 31 of the second base plate 26b shown in FIG. 18, and the first glass 30 is melted again and solidified in this state, whereby the two base plates 26a, 26b are bonded together with the glass, giving a block 33 as seen in FIG. 20.

Figure 21:
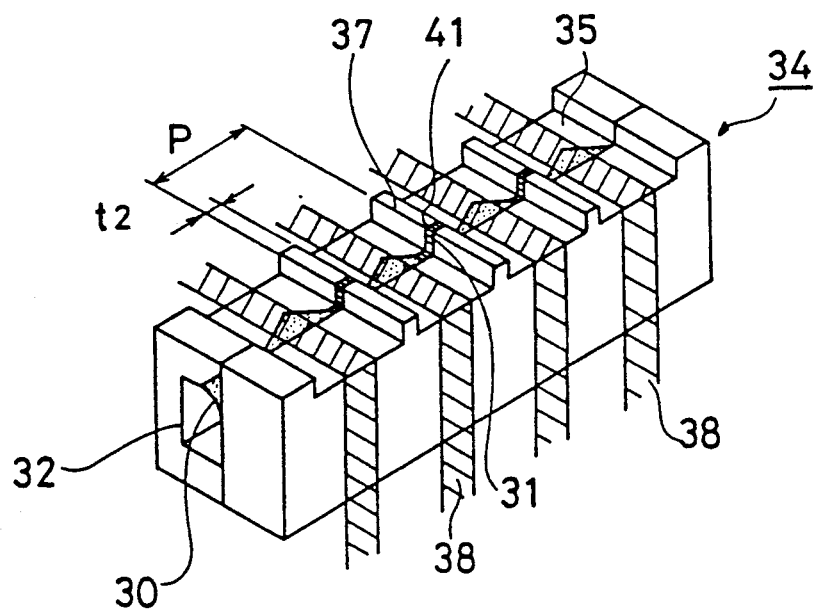

The block 33 is cut along broken lines C-C' into core blocks 34. Track width defining grooves 35 are thereafter cut at a pitch P in the head portion of each core block 34 to form a plurality of medium facing ridges 37 with the specified track width $t_2$ as shown in FIG. 21.

The core block 34 is then sliced at hatched regions 38 to prepare core chips 39 as seen in FIG. 22. The core chip 39 comprises a pair of core segments 40a, 40b made of Mn-Zn ferrite and bonded together with the first glass 30, with the thin ferromagnetic metal film 31 and the gap spacer 41 provided at the joint between the segments.

The core chip 39 is thereafter treated in the same manner as in the first embodiment. The chip 39 is bonded to a slider 16, as fitted in its slit 15, and the slider 16 is chamfered as indicated at 18 to finish the exterior, whereby a completed floating-type magnetic head is obtained as shown in FIG. 12.

With the second embodiment as in the case of the first, the core segments 40a, 40b made of the ferrite which is satisfactorily wettable with glass are bonded directly to each other with the glass at opposite sides of the medium facing ridge 37 as shown in FIG. 22. The core chip 39 therefore has high mechanical stregnth.

Like the first embodiment, the first and second base plates 26a, 26b are bonded together with the first glass 30 filled in the precut grooves 28 and the depth end grooves 29 in the second base plate 26b by softening the glass, so that the plates can be bonded merely by heating the assembly to a temperature slightly higher than the softening point of the first glass 30. Accordingly, little or no reaction proceeds at the interface between the first base plate 26a and the metal film 31. This inhibits the formation of a secondary gap at the interface.

Since the metal film 31 is deposited on the gap spacer 41 formed over the second base plate 26b as seen in FIG. 16, the gap spacer 41 is interposed between the second base plate 26b and the metal film 31. This eliminates the likelihood that a nonmagnetic amorphous layer will be formed on the surface of the second base plate 26b during the deposition of the metal film 31, consequently further inhibiting the secondary gap.

Incidentally, even if an amorphous layer is formed on the upper surface of the second base plate 26b when the gap spacer 41 shown in FIG. 16 is formed, the amorphous layer merely makes a nonmagnetic layer integral with the gap spacer 41 without creating a secondary gap.

Third Embodiment

FIG. 23 shows another floating type magnetic head as a third embodiment, which is produced by the process to be described below with reference to FIGS. 24 to 29.

First, mirror-surfaced first and second base plates 42a, 42b are prepared which are made of a ferrimagnetic oxide material such as Mn-Zn ferrite. As seen in FIG. 24, a plurality of glass filling grooves 44 are formed in the gap forming surface of the second base plate 42 to leave preliminary truck faces 43 having a preliminary truck width $t_1$ slightly larger than the desired track width $t_2$. A depth end groove 45 is also formed in the surface in a direction intersecting the glass filling grooves 44 perpendicular thereto. On the other hand, the first base plate 42a is coated with a thin ferromagnetic metal film 46 as of Sendust and a gap spacer 47 of $SiO_2$ or the like.

Figure 25:
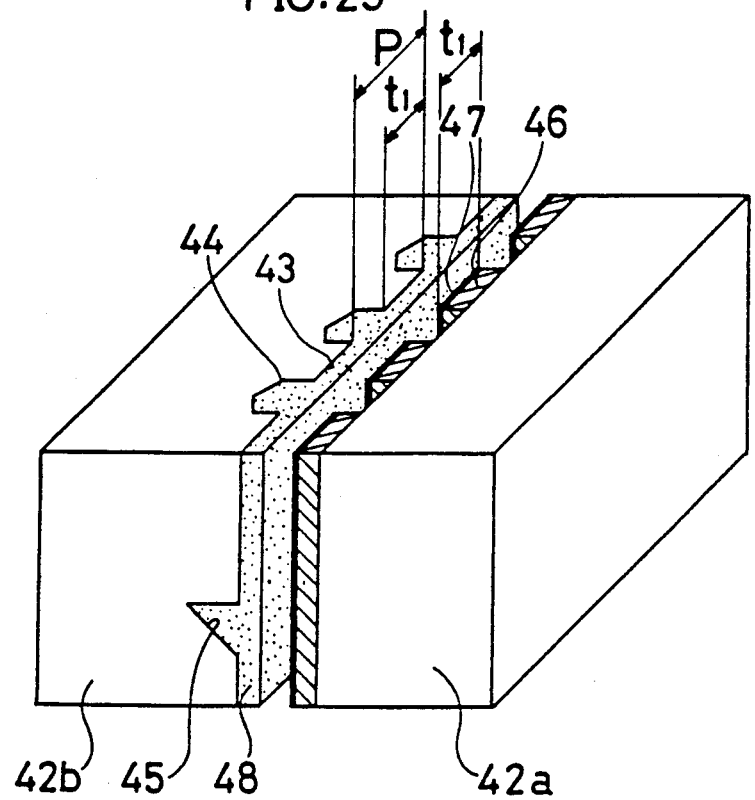

Next with reference to FIG. 25, a first glass 48 having a softening point of 590° C. is filled into the glass filling grooves 44 and the depth end groove 45 in the second base plate 42b, and the coated surface of the first base plate 42a is etched by an ion beam etching device or like dry etching device to form strips of metal film 46 and gap spacer 47 at a pitch P with the preliminary track width $t_1$.

Figure 26:
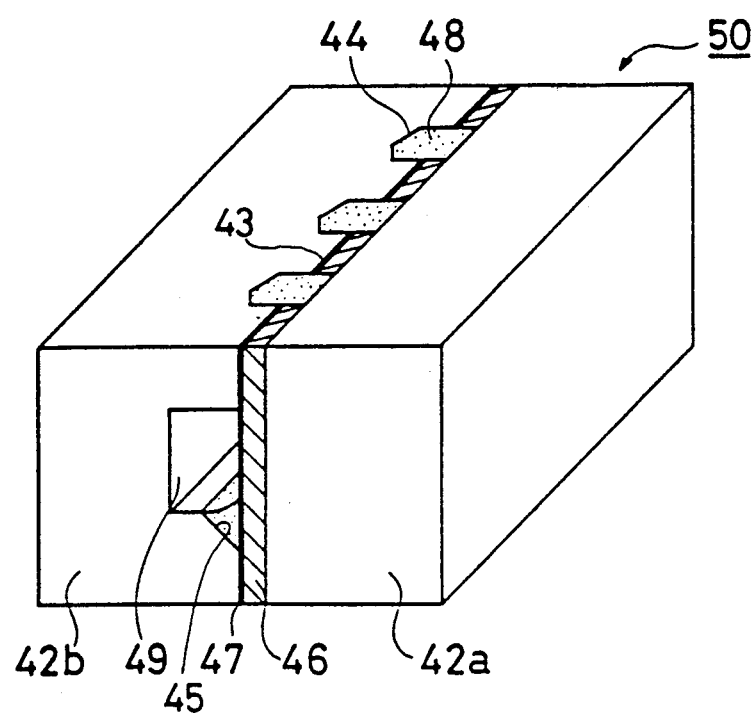

As shown in FIG. 26, the first glass 48 adhering to the preliminary track faces 43 of the second base plate 42b is removed by grinding or polishing to make the plate mirror-surfaced. A winding groove 49, rectangular in cross section, is formed in the base plate 42b in parallel to the depth end groove 45 so as to partially remove the grooved portion. Subsequently the two base plates 42a, 42b are fitted together with the truck faces 43 of the second base plate 42b opposed to the respective gap spacers 47 on the first base plate 42a, and the first glass 48 is then melted and solidified, whereby the two plates 42a, 42b are bonded together with the glass to give a core block 50.

Figure 27:
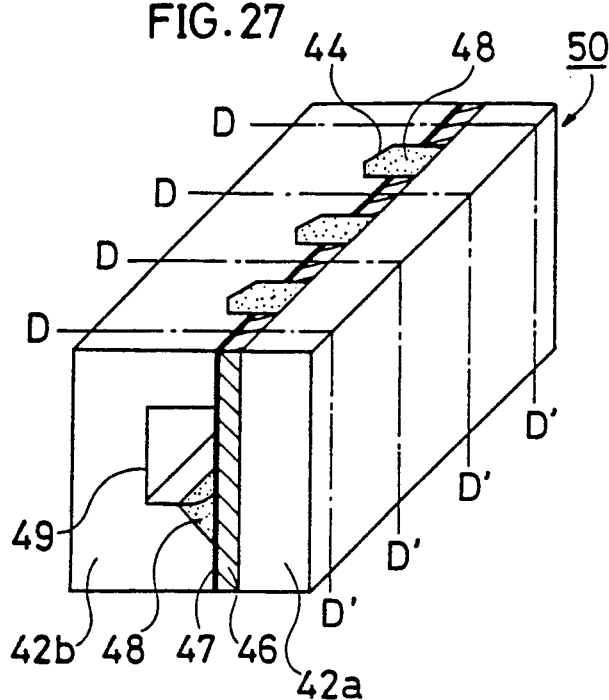
Figure 28:
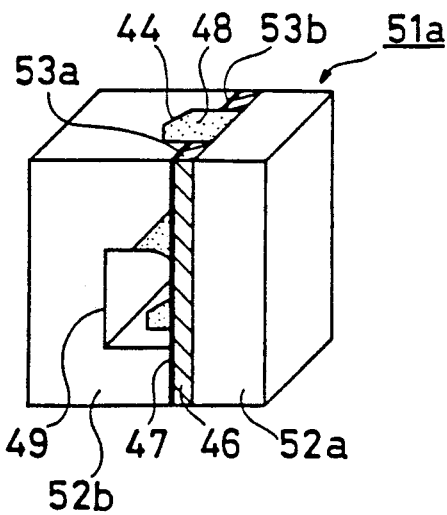

With reference to FIG. 27, the core block 50 is cut along broken lines D—D' into core chip assemblies 51a as seen in FIG. 28.

Each core assembly 51a comprises a pair of core segments 52a, 52b of Mn-Zn ferrite directly bonded to each other with the first glass 48 in the glass filling groove 44, and the metal film 46 and the gap spacer 47 are provided at the core joint portions 53a, 53b at opposite sides of the groove 44.

Figure 29:
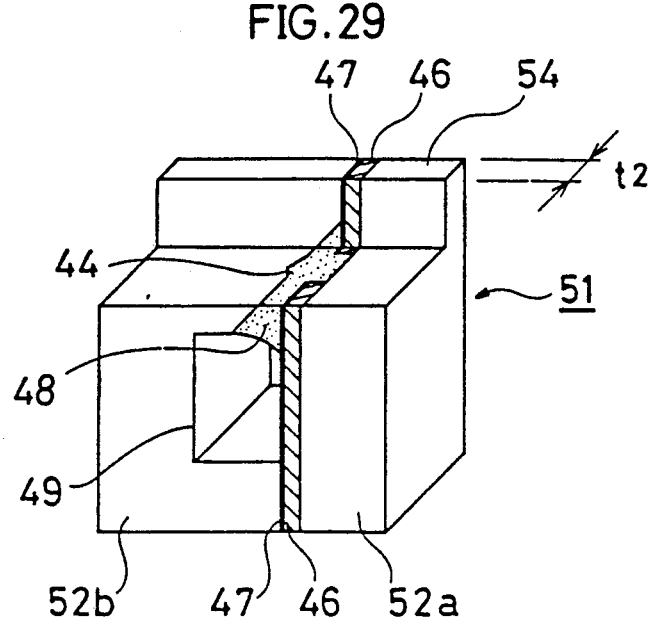

The head portion of the core chip assembly is then grooved to partially remove the joint portion 53a, the portion defining the glass filling groove 44 and the other joint portion 53b to form a medium facing ridge 54 having a magnetic gap portion with the desired track width $t_2$ as shown in FIG. 29, whereby a core chip 51 is obtained.

The same procedure as in the case of the first and second embodiments is thereafter followed. With reference to FIG. 23, the core chip 51 is bonded to a slider 16, as fitted in its slit 15, and the slider 16 is chamfereed as at 18 to finish the exterior to afford a completed floating-type magnetic core.

With the third embodiment as in the case of the other embodiments, the core segments 52a, 52b, which are made of the ferrite satisfactorily wettable with glass, are directly bonded to each other with the glass at the portion where the glass filling groove 44 is formed as seen in FIG. 29. The core chip 51 therefore has high mechanical strength.

The first and second base plates 42a, 42b are bonded together with the first glass 48 filling the groove 44 and the depth end groove 45 in the second base plate 42b by softening the glass as shown in FIG. 26 also in the above production process, so that the plates can be bonded merely by heating the assembly at a temperature about 80° C. higher than the softening point of the first glass 48. Consequently, almost no reaction proceeds at the interface between the first base plate 42a and the thin ferromagnetic metal film 46. This inhibits formation of the secondary gap conventionally created by reaction.

Since the core segments 52a, 52b of the core chip assembly 51a shown in FIG. 28 are firmly bonded together with the first glass 48 filled in the groove 44, the assembly 51a will not fracture when machined to form the medium facing ridge 54 of FIG. 29. This results in an improved yield.

The medium facing ridge 54 can be formed alternatively at the joint portion 53a on the other side of the glass filling groove 44 in opposite relation to the one shown in FIG. 29. Accordingly, when the medium facing ridge is provided selectively at one of these two different positions, two kinds of magnetic heads can be fabricated; one for use above the magnetic disc and the other for use under the disc.

Fourth Embodiment

Figure 30:
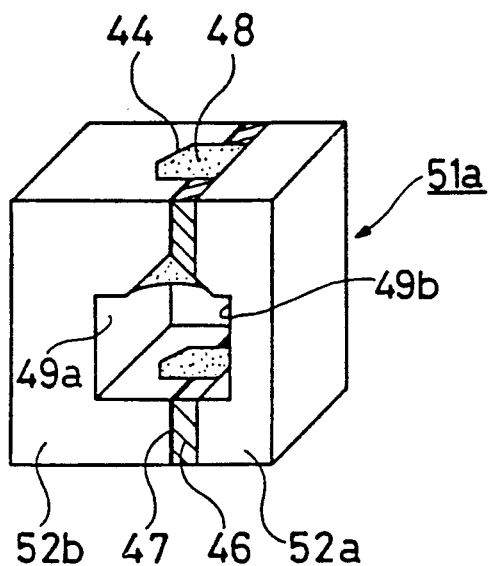
FIGS. 30 and 31 are views showing steps of a process for producing another magnetic head as a fourth embodiment.
Figure 31:
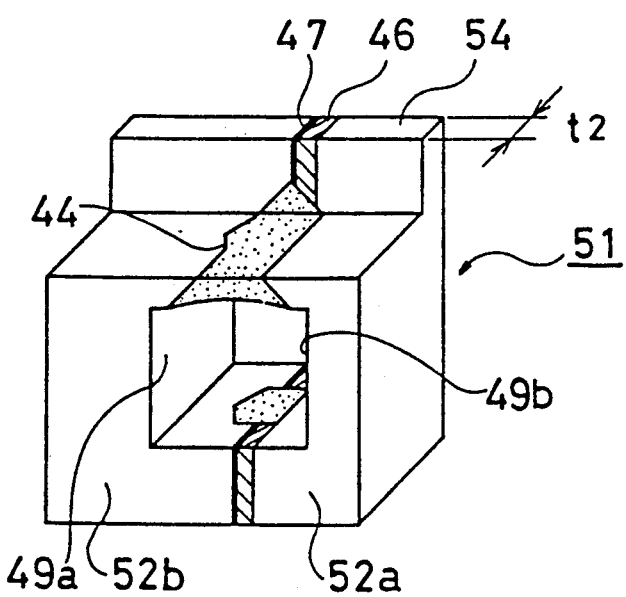
Figure 32:
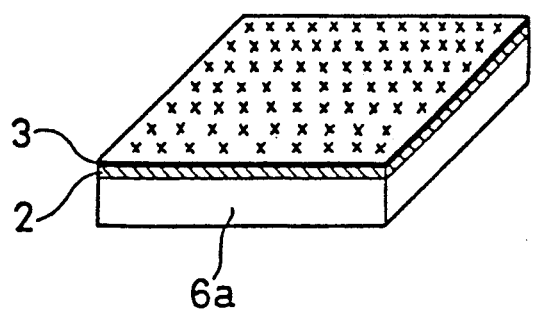
FIGS. 32 to 40 are views for illustrating stepwise the process for producing a conventional floating-type magnetic head.
Figure 33:
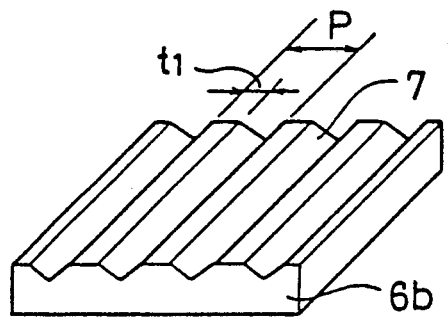
Figure 34:
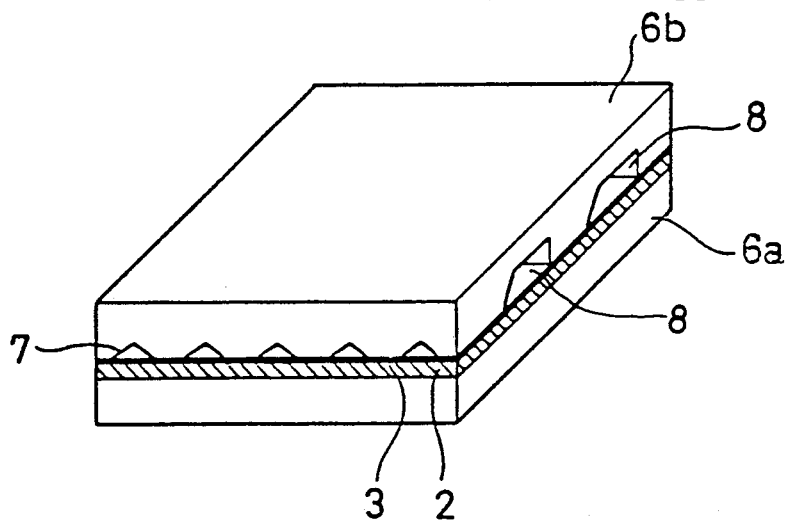
Figure 35:
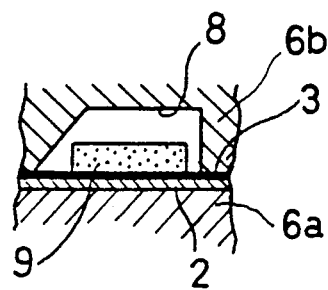
Figure 36:
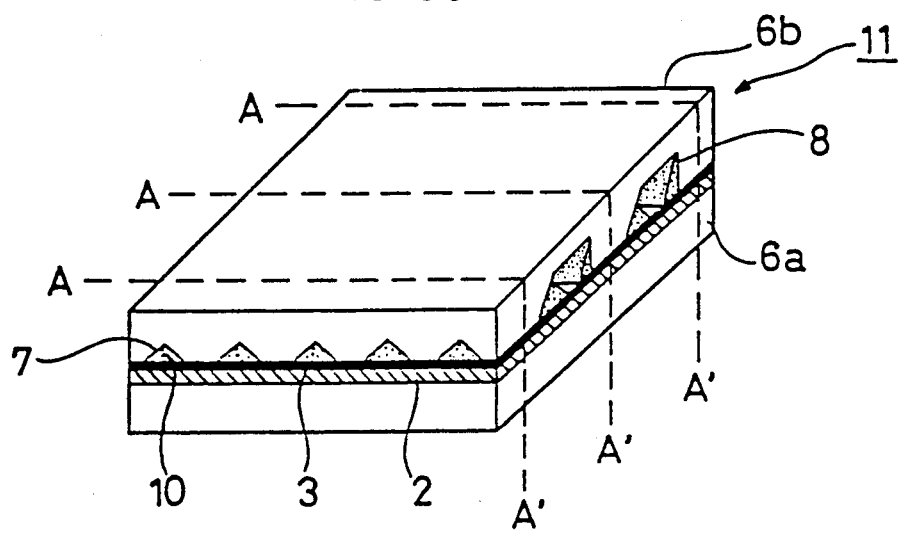
Figure 37:
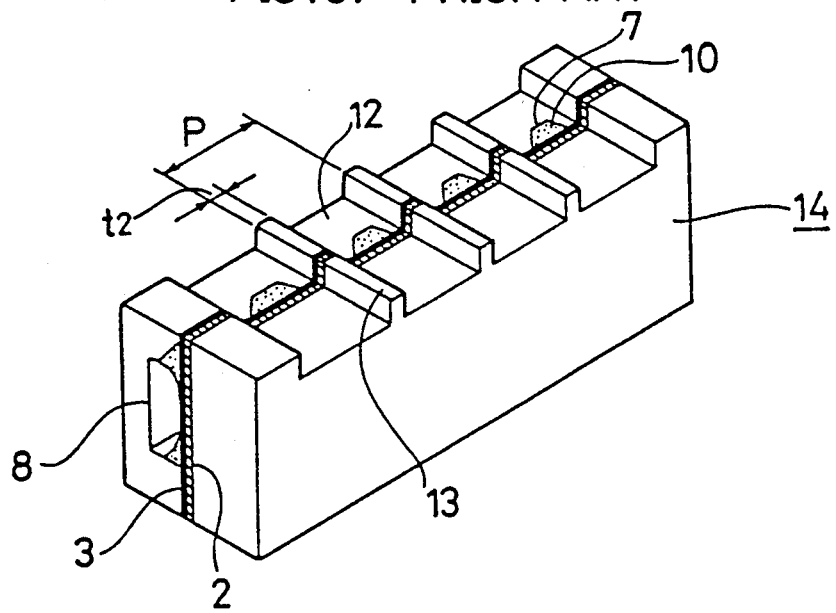
Figure 38:
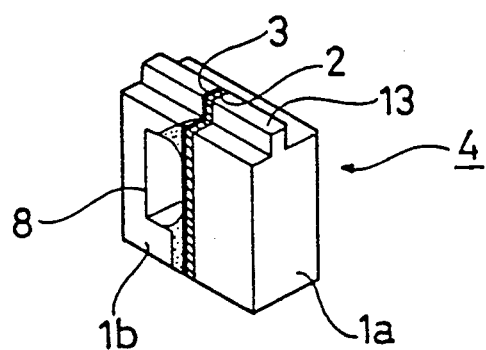
Figure 39:
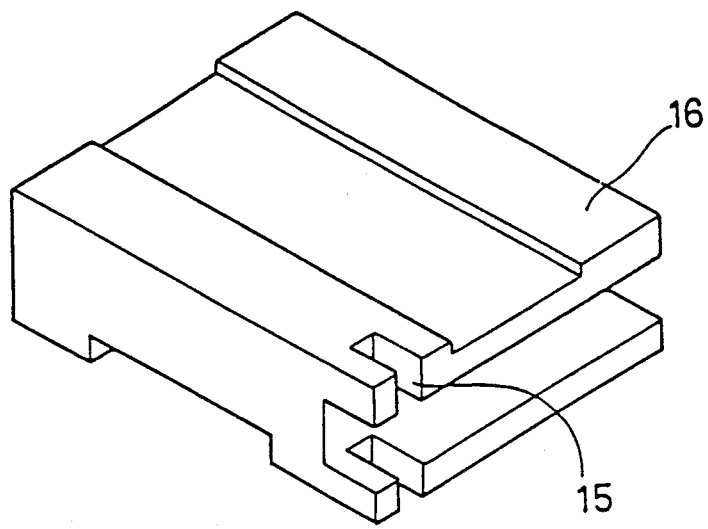

The magnetic head of a fourth embodiment is produced by substantially the same process as the third embodiment with the exception of the following feature. With reference to FIG. 30, a core chip assembly 51a is fabricated which comprises a pair of core segments 52a, 52b formed with winding grooves 49a, 49b, respectively. The assembly 51a is thereafter machined to form a medium facing ridge 54 as seen in FIG. 31.

With the magnetic head of the floating type thus obtained, the pair of core segments 52a, 52b provides an efficient magnetic path, enabling the head to exhibit improved recording-reproduction performance.

In brief, the floating-type magnetic heads of the floating type embodying the present invention have a magnetic gap with a very accurate length and are excellent in mechanical strength. These magnetic heads can be produced by the process of the invention with formation of a secondary gap inhibited effectively.

The construction of the magnetic head of the invention is not limited to those of the foregoing embodiments but can be modified variously by one skilled in the art without departing from the scope of the invention as defined in the appended claims.

What is claimed is:

1. A process for producing magnetic heads of the floating type, comprising the steps of:

preparing sliders of nonmagnetic material;

fabricating core chips, each composed of a pair of core segments joined together, and a gap spacer and a thin ferromagnetic metal film provided at the joint between the pair of core segments; and securing each of the core chips to the slider, wherein the core chip fabricating step includes the steps of:

preparing first and second base plates made of a ferrimagnetic oxide and forming on the surface of the first base plate to be bonded to the second base plate a plurality of strips, each composed of a thin ferromagnetic metal film and a gap spacer over the metal film and having a width larger than a desired track width, bonding together the first base plate and the second base plate with a first glass to prepare a core block, wherein the first glass is melted so that the molten glass fills up every corner around the strips of metal film and gap spacer between the two base plates, cutting track width defining grooves in the core block to form a plurality of medium facing ridges, each including the metal film and the gap spacer and having a width equal to the desired track width, and cutting the resulting core block into core chips, each including the metal film and the gap spacer, wherein substantial portions of inner surfaces of the two base plates constructing each of the core chips directly contact opposing surfaces of said first glass, respectively, wherein each of the core chips obtained from the cutting step is bonded to the slider with a second glass having a lower softening point than the first glass.

2. A process as defined in claim 1, wherein the core chip fabricating step includes the steps of forming a plurality of precut grooves in the second base plate between the strip-like surface areas thereof to be joined to the gap spacers and filling the precut grooves with the first glass, and melting and solidifying the first glass with the first and second base plates joined together.

3. A process as defined in claim 2, wherein the core chip fabricating step includes the steps of forming at least one depth end groove in the surface to be joined of the second base plate to intersect the plurality of precut grooves perpendicular thereto, and filling the first glass into the grooves.

4. A process as defined in claim 1, wherein the step of preparing the first and second base plates includes the step of forming a thin ferromagnetic metal film and gap spacer over the entire area of the surface to be joined of the first base plate and thereafter dry-etched to form the strips of metal film and gap spacer.

5. A process for producing magnetic heads of the floating type, comprising the steps of:

preparing sliders of nonmagnetic material;

fabricating core chips, each composed of a pair of core segments joined together, and a gap spacer and a thin ferromagnetic metal film provided at the joint between the pair of core segments; and securing each of the core chips to the slider, wherein the core chip fabricating step includes the steps of:

preparing first and second base plates made of a ferromagnetic oxide and forming on the surface of the second base plate to be bonded to the second base plate a plurality of strips, each composed of a gap spacer and a thin ferromagnetic metal film over the gap spacer and having a width larger than the desired track width, bonding together the first base plate and the second base plate with a first glass to prepare a core block, wherein the first glass is melted so that the molten glass fills up every corner around the strips of metal film and gap spacer between the two base plates, cutting track width defining grooves in the core block to form a plurality of medium facing ridges, each including the metal film and the gap spacer and having a width equal to the desired track width, and cutting the resulting core block into core chips, each including the metal film and the gap spacer, wherein substantial portion of inner surfaces of the two base plates constructing each of the core chips directly contact opposing surfaces of said first glass, respectively, wherein each of the core chips obtained from the cutting step is bonded to the slider with a second glass having a lower softening point than the first glass.

6. A process as defined in claim 5, wherein the step of preparing the first and second base plates includes the step of forming a plurality of precut grooves in the second base plate between the strip-like surface areas thereof to be formed with the gap spacer and filled with the first glass, and the gap spacer and the thin ferromagnetic metal film are thereafter formed over the surface of the second base plate, the first and second base plates being bonded to each other by melting and solidifying the first glass with the two base plates joined together.

7. A process as defined in claim 6, wherein the core chip fabricating step includes the steps of forming at least one depth end groove in the surface to be joined of the second base plate to intersect the plurality of precut grooves perpendicular thereto, and filling the first glass into the grooves.

8. A process as defined in claim 5, wherein the step of preparing the first and second base plates includes the steps of forming a gap spacer and a thin ferromagnetic metal film are formed over the entire area of the surface to be joined of the second base plate and thereafter dry-etching the gap spacer and the metal film to form the strips of metal film and gap spacer.

9. A process for producing a magnetic head of the floating type comprising the steps of:

preparing a slider of nonmagnetic material;

fabricating a core chip assembly including a pair of core segments made of a ferromagnetic oxide and joined together, and a gap spacer and a thin ferromagnetic metal film provided at the joint between the pair of core segments; and securing to the slider a core chip obtained by machining the core chip assembly and having a specified shape, wherein the core chip assembly fabricating step includes the steps of:

filling into a glass filling groove formed in the center of the joint surface of one of the core segments a first glass in contact with the joint surface of the other core segment to bond the pair of core segments to each other with the first glass, the metal film and the gap spacer being provided at the core segment joint on opposite sides of the glass filled groove, cutting a track width defining groove in the head portion of the core chip assembly to form a ridge having the specified track width and to be opposed to a magnetic recording medium at the joint portion on one side of the groove, and bonding the resulting core chip to the slider with a second glass having a lower softening point that the first glass.

10. A process as defined in claim 9 wherein the core chip assembly fabricating step comprises the first step of preparing first and second base plates of ferrimagnetic oxide, forming on the joint surface of the first base plate a plurality of strips each composed of a thin ferromagnetic metal film and a gap spacer over the metal film and having a width larger than the specified truck width, forming a plurality of glass filling grooves in the joint surface of the second base plate between the strip-like areas thereof to be joined to the gap spacer, and filling the first glass into the grooves, the second step of melting and solidifying the first glass with the first and second base plates joined together to bond the two base plates and prepare a core block, and the third step of cutting the core block into core chip assemblies each including the glass filling groove.

11. A process as defined in claim 10, wherein the core chip assembly step includes the steps of forming at least one depth end groove in the joint surface of the second base plate to intersect the plurality of glass filling grooves perpendicular thereto, and filling the first glass into the grooves.

12. A process as defined in claim 10, wherein the core chip fabricating step includes the step of forming a thin ferromagnetic metal film and a gap spacer over the entire area of the joint surface of the first base plate and thereafter dry-etching the metal film and the gap spacer to form the strips of metal film and gap spacer.

* * * * *